Dec. 29, 1925.

R. E. HELLMUND

SYSTEM OF CONTROL

Filed March 13, 1920.

WITNESSES:
J.B. Merrill
W.P. Coley

INVENTOR
Rudolf E. Hellmund
BY
Wesley G. Carr
ATTORNEY

Dec. 29, 1925.  
R. E. HELLMUND  
1,567,591  
SYSTEM OF CONTROL  
Filed March 13, 1920   2 Sheets—Sheet 2
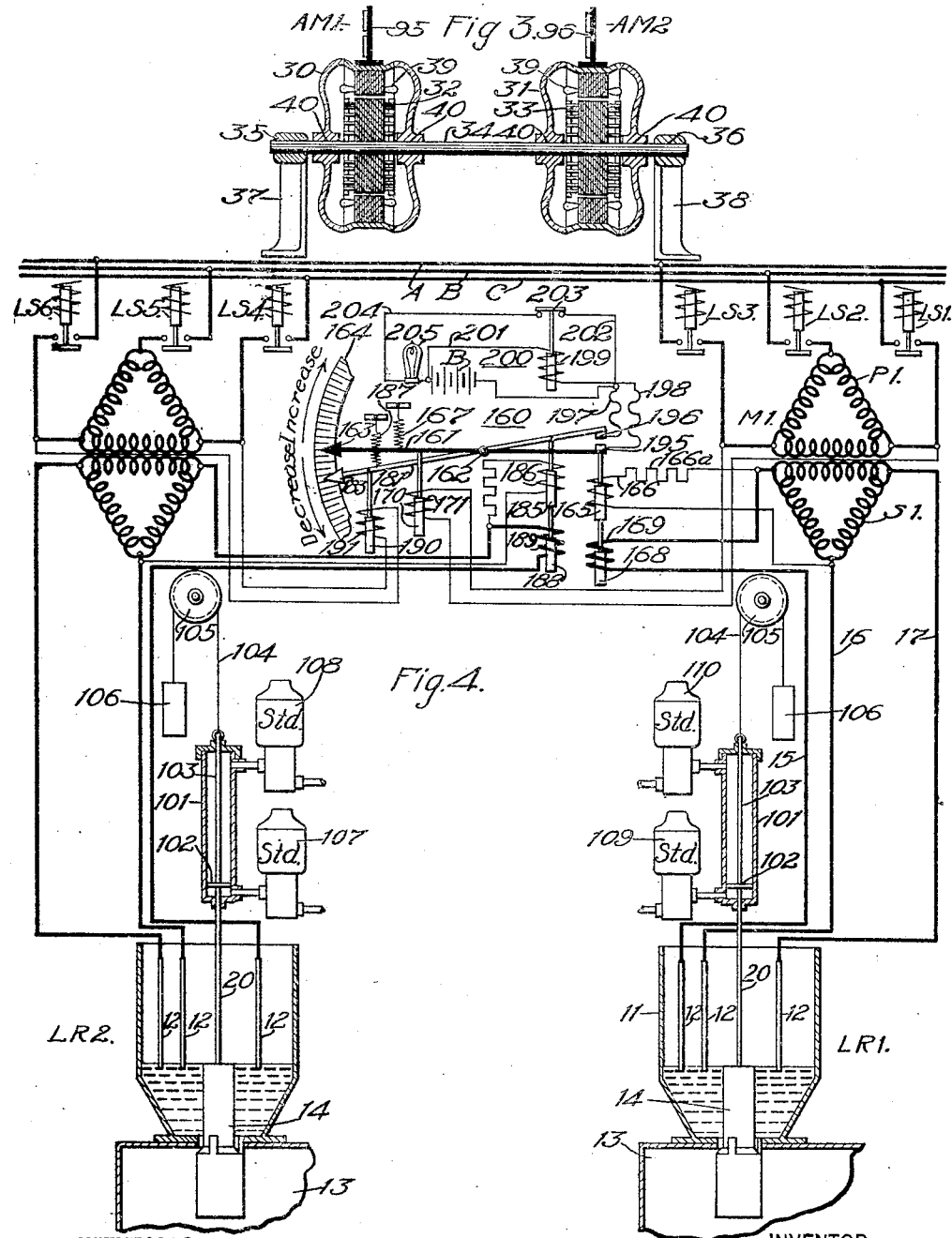
WITNESSES:  
J.B. Merrill  
W.R. Coley
INVENTOR  
Rudolf E. Hellmund  
BY  
Wesley G. Carr  
ATTORNEY Patented Dec. 29, 1925.

1,567,591

UNITED STATES PATENT OFFICE.

RUDOLF E. HELLMUND, OF SWISSVALE, PENNSYLVANIA.

SYSTEM OF CONTROL.

Application filed March 13, 1920. Serial No. 365,393.

*To all whom it may concern:*

Be it known that I, RUDOLF E. HELLMUND, a citizen of Germany, and a resident of Swissvale, in the county of Allegheny and State of Pennsylvania, have invented a new and useful Improvement in Systems of Control, of which the following is a specification, this application being a continuation in part of my copending application Serial No. 70,437, filed January 5, 1916.

My invention relates to electrically-propelled vehicles and to systems of control therefor and especially to vehicles that are driven by a plurality of induction motors.

One object of my invention is to provide, in connection with a system of the above-indicated character, means which shall be relatively simple and inexpensive in construction and effective and reliable in operation for automatically indicating or signalling motor conditions when any set of driving wheels "slips", that is, rapidly rotates without gripping the rails.

According to my present invention, I provide electrical relay means that are electrically connected with the rotors of the several driving induction motors and are adapted to counter-balance each other under normal and substantially equal-speed conditions of the motors, but which are adapted to produce an unbalanced effect under predetermined unequal rotor-speed conditions, such as occur upon the slippage of one motor and the corresponding wheels, and I associate with the relay means certain switching means for automatically effecting an indication or producing a signal under slippage conditions, as hereinafter more fully set forth.

In the accompanying drawings, Fig. 1 is a diagrammatic view of an electric locomotive unit embodying a plurality of driving motors to which my invention may be applied; Fig. 2 is a diagrammatic view of the essential circuits of a system of control embodying my invention; Fig. 3 is a diagrammatic view, showing the details of construction of a portion of the apparatus that is shown in Fig. 2; and Fig. 4 is a diagrammatic view of a modification of my invention.

Referring to Fig. 1, the structure shown comprises a locomotive cab 1 which is suitably supported upon a plurality of articulated trucks 2 and 3 of suitable design and which respectively embody a plurality of driving wheels 4 and 5, that are adapted to run upon rails 6, in accordance with usual practice. A plurality of driving induction motors M1 and M2 are provided and may be associated with the wheels of the various trucks in any suitable manner, as by driving mechanisms 7 and 8 of a familiar type.

Referring now to Fig. 2, the system shown comprises a plurality of suitable three-phase supply-circuit conductors A, B and C; the driving induction motors M1 and M2 that may respectively comprise delta-connected primary windings P1 and P2 and cooperating delta-connected secondary or rotor windings S1 and S2; a plurality of suitable variable accelerating resistors LR1 and LR2 for the rotor windings S1 and S2 respectively; a plurality of main-circuit switches LS1, LS2 and LS3 for connecting the primary winding P1 to the supply-circuit conductors; a plurality of similar switches LS4, LS5 and LS6 for performing a similar function with respect to the primary winding P2; a plurality of auxiliary induction motors AM1 and AM2 that are associated with the main rotor windings S1 and S2 in a manner and for a purpose to be described; an auxiliary source of energy, such as a battery B; a plurality of indicating or signalling means IM1 and IM2, corresponding to the respective main motors; and a starting switch SW.

The variable resistors LR1 and LR2 are here shown as comprising resistors of the familiar liquid-rheostat type and severally embody suitable electrolyte-containing tanks or chambers 11, within which are disposed a plurality of suitable immersible plates or electrodes 12, as is customary; and lower compartments 13 from which the electrolyte may be pumped into the tanks 11 and to which the electrolyte may be returned in accordance with the action of suitable regulating and discharge valves 14 that are more fully described in a patent to Arthur J. Hall, No. 1,300,383, granted April 15, 1919, and assigned to the Westinghouse Electric & Manufacturing Company. Inasmuch as the particular type of rheostat and the structural details thereof are immaterial to my present invention, I do not deem it necessary to describe the same any further.

The electrodes or plates 12 of the rheostat LR1 are respectively connected to the terminals of the secondary winding S1 by conductors 15, 16 and 17, and the electrodes of the other rheostat LR2 are similarly connected to the secondary winding S2.

The operating mechanism for each of the valves 14, whereby electrolyte is admitted to the tank 11 to gradually decrease the rotor-circuit resistance or is discharged from the tank 11 to the compartment 13 to increase such resistance, comprises a suitable operating cylinder 101 within which is disposed a piston member 102 that is associated with the rod 20 of the valve 14, while a second rod 103 is secured to the opposite side of the piston 102 and is of a sufficient length to extend through one end of the cylinder 101 when the piston 102 is located at the other end thereof. The rod 103 is connected to a cord or cable 104 that passes over a pulley 105 and has a suitable counterbalancing weight 106 attached to its outer end. A pair of standard or normally closed magnet valves 107 and 108 are associated with the respective ends of the cylinder 101 for admitting fluid pressure to the one or the other side of the piston 102 in accordance with the energization of the respective valve magnets. The other liquid rheostat LR2 is provided with a similar pair of operating valve magnets 109 and 110.

The electrical relay means that here comprise the auxiliary induction motors AM1 and AM2 are more clearly structurally illustrated in Fig. 3. The auxiliary induction motors respectively comprise stators 30 and 31, and squirrel-cage rotors 32 and 33 that are rigidly mounted upon a suitable shaft 34 the ends of which are carried in suitable bearings 35 and 36 that are respectively supported by pedestals or brackets 37 and 38.

The stators 30 and 31 are severally provided with suitable phase windings 39 and with bearings 40 on the shaft 34, whereby the stators may rotatively move within predetermined limits, as about to be described, under certain torque conditions. The stators 30 and 31 are respectively provided with switching devices 95 and 96, here shown as being of the face-plate type, that may be biased to positions marked "Decrease" by means of suitable springs 43, and, in these positions the devices respectively rest against stops or pins 45 and 47 that are suitably associated with any stationary member, such as projections of the bearing brackets 37 and 38, if desired. The switching devices 95 and 96 are also severally adapted to occupy second positions marked "Increase" when the stators 30 and 31 are actuated as far as second stops or pins 44 and 46, respectively, under predetermined operating conditions to be described later.

The terminals of the stator winding of the auxiliary induction motor AM1 are connected to the respective terminals of the secondary winding S1 by conductors 48, 49 and 50, and the stator winding of the other auxiliary induction motor AM2 is similarly associated with the other main secondary winding S2.

Assuming that it is desired to effect acceleration of the driving motors, the switches LS1 to LS6, inclusive, may be closed in any suitable manner and the switch SW may be actuated to its upper position marked "Dec.", standing for decrease, whereby a circuit is established from one terminal of the battery B through conductors 120 and 121, the blade 122 of the switch SW, stationary contact member 123, conductors 124 and 125, actuating coil 107 of the operating mechanism of the liquid rheostat LR1, conductor 126, control fingers 127 and 128, which are bridged by contact member 97 of the switching device 95 in its normal position "Decrease", and conductors 129, 130 and 131 to the negative battery terminal. A parallel circuit is completed from conductor 125 through conductor 132, the actuating coil 109 of the operating mechanism of the rheostat LR2, conductor 133, control fingers 134 and 135, which are bridged by contact member 99 of the auxiliary switching device 96, and conductors 136, 137 and 138 to the negative conductor 131. In this way, the operating mechanisms of the liquid rheostats are actuated to admit electrolyte to the tanks 11 and gradually decrease the rotor-circuit resistances of the driving induction motors.

To effect the discharge of the electrolyte from the tanks 11, the switch SW may be actuated to its other position marked "Inc." standing for increase, whereupon one circuit is established from the blade 122 of the switch SW, through stationary contact member 139, conductor 140, actuating coil 108 of the liquid rheostat LR1, and conductor 141 to the negative conductor 130. A simultaneous circuit is completed from the switch blade 122 through stationary contact member 142, conductors 143 and 144, actuating coil 110 of the liquid rheostat LR2 and conductor 145 to the negative conductor 131. Thus, fluid pressure is admitted above the pistons 102, the valves 14 are opened and the electrolyte is discharged from the tanks 11.

Assuming that the wheels 4 that are associated with the driving motor M1 "slip" while the switch SW occupies its position "Dec.", so that the primary current in the winding P1 is relatively low, while the speed of the rotor winding S1 is relatively high and its frequency low, the rotor 32 of the auxiliary induction motor AM1 will tend to rotate at a lower speed that corresponds to the decreased speed of the rotating field in the stator 30. However, such decreased speed will be prevented, at least partially, by the normal action of the mechanically associated rotor 33 of the other auxiliary induction motor tending to drive the rotor 32 over-synchronously, so that a reactive or generator torque is exerted upon the stator 30, whereby the stator rotatively moves in a clockwise direction until the switching device 95 strikes the stop 44 and the switching device occupies its position "Increase."

Consequently, a circuit is completed from one terminal of the battery B through conductor 146, control fingers 147 and 148, which are bridged by the contact member 97 of the switching device 95, conductors 149 and 140 and thence through the actuating coil 108 of the liquid rheostat LR1. The other actuating coil 107 is simultaneously de-energized by reason of the disengagement of the contact member 97 from the control fingers 127 and 128. Thus, fluid pressure is admitted to the cylinder 101 above the piston 102 and is exhausted from below the piston through the valve that is associated with the magnet 107, and the resistance of the circuit of the rotor winding S1 is gradually increased until the speed of the slipping motor is reduced to normal when the normal motor torque, or such torque, assisted by the spring 43, if employed, will return the switching device 95 to the normal solid-line position.

It will be observed that the movement of the switching device 95 first de-energizes the actuating coil 107 and energizes the coil 108 of the liquid rheostat LR1, whereby the electrolyte is discharged through the valve 14 to the compartment 13, or, in other words the resistance in the circuit of the rotor winding S1 is increased until the speed of the rotor S1 has decreased to normal value, when the generator torque of the auxiliary induction motor AM1 disappears and the normal motor torque, assisted by the spring 43, returns the switching device 95 to the position shown in the drawing.

The movement of the switching device 95 to its position "Increase" establishes another circuit from conductor 146 through conductor 150, control fingers 151 and 152, which are bridged by contact member 98 of the switching device 95, the indicating means IM1 and conductor 153 to the negative conductor 138, thereby notifying the train operator of the slipping conditions of the motor M1. The indicating means IM1 and IM2 may comprise lamps, bells or the like, and are preferably disposed near a train operator so that he may readily notice the indications or signals without turning away from his regular work.

It will be understood that, under slippage conditions of the other main motor M, the switching device 96 is automatically actuated to its dotted-line position "Inc.", whereupon the slippage conditions are automatically eliminated, and the indicating means IM2 is energized.

It will thus be seen that I have provided simple and reliable means for automatically restoring normal conditions in case of the slippage of any driving motor and corresponding set of wheels, and for automatically indicating or signalling to a train operator that a certain motor is "slipping."

Reference may now be had to Fig. 4, wherein the system shown comprises the supply-circuit conductors A, B and C, the induction motors M1 and M2 and the line switches LS1 to LS6, inclusive, as previously described, together with a combined speed indicating and signaling means 160.

The device 160 is of the duplex type, similar to the air-brake pressure gauge with the black and red pointers, and is employed to indicate the respective speeds of two driving motors and also to signal the occurrence of wheel slippage in connection with any motor. One of the distinct sets of parts of the device 160, corresponding to the motor M1, may comprise a movable element or pointer 161 that is pivoted at an intermediate point 162 and the pointer end 163 of which plays over a suitable scale 164 that is graduated to preferably indicate miles per hour.

Pivotally attached to the end of the movable element 161 that is remote from the pointer 163, is a core member 165 having an actuating coil 166 that is connected through a high-value resistor 166a across one phase winding of the motor secondary winding S1. A spring 167, that is located on the opposite side of the pivotal point 162 from the core member 165, is adapted to act in opposition to the coil 166. In other words, the spring 167 tends to move the pointer upwardly in the direction marked "Increase," while the actuating coil 166 tends to move the pointer downwardly in the direction marked "Decrease." The function of the resistor 166a is to ensure a true voltage measurement by rendering the effect of the inductance of the coil 166 substantially negligible.

As is well known, the voltage across the terminals of a secondary phase winding of an induction motor varies directly as the electrical slip of the rotor, that is, inversely in accordance with the increase of motor speed. For an instant when the motor is started, the secondary voltage is determined by the transformer ratio between the primary and the secondary motor windings P1 and S1, respectively, while, upon rotation of the motor, the secondary voltage gradually decreases until the minimum voltage, corresponding to normal slip for the load carried, is reached. The actuating coil 166 of the speed-indicating device 160 is, at all times, energized in accordance with the secondary voltage and may thus be employed to indicate the speed of the machine.

To afford a more accurate or sensitive measurement of motor speed, a second core member 168 may be attached to the above-mentioned core member 165 to be energized by a current coil 169 that is connected in series relation with one phase conductor 15 for the secondary winding S1. The coil 169 is adapted to assist the coil 166, thus compensating for the voltage drop in the secondary phase winding. In other words, as the secondary load current increases, whereby the IR drop in increased, the magnetic attraction exerted by the current coil 169 is correspondingly augmented to compensate for the lowered magnetic pull of the voltage coil 166.

Furthermore, in case the primary voltage of the induction motor is variable, correction therefor may be made by means of a core member 170 that is pivotally associated with the movable element 161 on the same side of the pivotal point 162 as the spring 167, the core member 170 being provided with an actuating coil 171 that is connected across one phase of the primary motor winding P1 and is adapted to assist the action of the spring 167, that is, to oppose the action of the secondary voltage coil 166. Consequently, if the primary or line voltage increases, the pull of the actuating coil 171 will likewise increase to cause the pointer 163 to move to a position corresponding to the higher speed of the induction motor rotor, whereas, in the event of a reduction of line or primary voltage, the opposite effect occurs. In this way, the effect of fluctuating line voltage is properly compensated for.

The other distinct set of parts of the device 160, corresponding to the other induction motor M2, is similar to that already described with the exception of some distinguishing mark of its indicating pointer 181 with respect to the other pointer 161. For example, the superimposed pointers may be respectively red and black, as in the case of the air-pressure gauge, or any other suitable expedient may be employed.

The remaining elements 183 and 185 to 191, inclusive, corresponds in structure and function to the previously-described members 163 and 165 to 171, respectively, and, consequently, need not be further described here.

It will thus be seen that the device 160 provides at all times indications of both the absolute and the relative speeds of the respective driving motors, by means of the corresponding pointers 161 and 181.

In addition, the device 160 is adapted to produce a signal in the event of wheel-slippage conditions corresponding to either motor. It will be noted that, whenever the two pointer elements 161 and 181 occupy similar positions, indicating that the speeds of the two motors are the same, a contact segment 195, that is mounted upon, and suitably insulated from, the end of the movable element 161 that is remote from the pointer 163, engages a contact member 196 that is similarly related to the other pointer element 181. In this case, a circuit is established from the positive terminal of a battery B or other suitable source of energy through flexible conductor 197, contact members 196 and 195, flexible conductor 198, the actuating coil 199 of a relay device 200 and thence through conductor 201 to the opposite battery terminal.

Consequently, the relay 200 is lifted to its open-circuit position and no signal is produced near the train operator so long as the motor speeds remain the same.

However, as soon as the two pointer elements separate by a predetermined amount, as indicated in the drawing, thus showing that the one or the other motor is undergoing slippage conditions, the contact members 195 and 196 are separated to de-energize the relay 200 and allow it to drop to its lower or circuit-closing position. Under these conditions, a new circuit is established from the positive terminal of the battery B through conductor 202, contact disk 203 of the relay 200, conductor 204 and the indicating means 205, such as an electric lamp, to the negative battery terminal.

In this way, a visual signal is produced by the device 160 whenever either of the driving motors is slipping. Consequently, the device 160 is adapted to continually indicate the individual or absolute speeds of the driving motors and, at the same time, is adapted to produce a warning signal whenever either of the motors is undergoing slippage conditions.

I do not wish to be restricted to the specific circuit connections, structural details or arrangement of parts herein set forth, as various modifications thereof may be made without departing from the spirit and scope of my invention. I desire, therefore, that only such limitations shall be imposed thereon as are indicated in the appended claims.

I claim as my invention:

1. In a device for indicating the speed of an induction motor, in combination, a speed-indicating member, and means for actuating said member, said actuating means comprising a voltage coil energized by the secondary voltage of the motor and a current coil disposed to carry the secondary current of the same motor.

2. The combination with a plurality of asynchronous motors, of a plurality of speed-indicating members, one for each motor, means for actuating said members, said actuating means including a voltage coil and a current coil energized by the respective motor secondary voltages and means dependent upon the relative movement of the indicating members caused by differences in speed of the motors to produce a signal.

3. The combination with a plurality of asynchronous motors, of a plurality of speed-indicating members, one for each motor, means for actuating said members, said actuating means including a voltage coil and a current coil energized by the respective motor secondary voltages, and means dependent upon the relative movements of the indicating members caused by differences in speed of the motors adapted to produce a signal, said indicating members being disposed to rotate about a common axis, thereby to indicate the differences in speed of the motors.

4. The combination with a plurality of induction motors, of a plurality of speed-indicating members, one for each motor, means for actuating said members, said actuating means including a voltage coil and a current coil energized by the respective motor secondary voltages, means energized by the respective motor primary voltages to oppose said actuating means, thereby to compensate for variations in the primary voltages, and means dependent upon the relative movements of the indicating members, caused by differences in speed of the motors, to produce a signal.

5. The combination with a plurality of induction motors, of a plurality of speed-indicating members, one for each motor, and means for actuating said members, said actuating means including a voltage coil and a current coil energized by the respective motor secondary voltages, said indicating members being disposed to rotate about a common axis to indicate differences in the speeds of the motors, means energized in accordance with the motor primary voltages to oppose said actuating means to compensate for variations in the primary voltages, and means dependent upon the relative movements of the indicating members caused by differences in speed of the motors to produce a signal.

6. The combination with a plurality of asynchronous motors, of means energized solely by the respective motor-secondary voltages adapted to indicate absolute and relative motor speeds, and means co-operative with the indicating means to produce a signal upon a predetermined difference in the speed of the motors.

7. The combination with a plurality of induction motors, of means including a plurality of movable elements energized solely by the respective motor-secondary voltages to indicate the motor speeds, and means cooperative with the indicating means to produce a signal upon predetermined relative variations in speed.

8. The combination with a plurality of induction motors, of a device including a plurality of pointer elements having actuating coils connected to the respective motor-secondary windings, means adapted to produce a signal, and means carried by said elements adapted to effect the operation of the signal producing means when said elements are moved to predetermined positions relative to one another.

9. The combination with a plurality of induction motors, of a duplex speed-indicating device including a plurality of superimposed pointer elements having actuating coils connected to the respective motor-secondary windings, means adapted to produce a signal, and contact means carried by said elements adapted to effect the operation of the signalling means when said elements are moved to predetermined positions relative to one another.

In testimony whereof, I have hereunto subscribed my name this 26th day of February 1920.

RUDOLF E. HELLMUND.